United States Patent [19]

Broyles et al.

[11] 4,192,539
[45] Mar. 11, 1980

[54] STAND-UP TRASH RETRIEVING AND DUMPING DEVICE

[76] Inventors: Marshall W. Broyles, 201 Lincoln Ave.; Charles D. Schrader, 119 E. Monroe St., both of Alexandria, Ind. 46001

[21] Appl. No.: 929,163

[22] Filed: Jul. 28, 1978

[51] Int. Cl.² .............................................. B25J 1/00
[52] U.S. Cl. .................................. 294/19 R; 294/50.9; 294/104
[58] Field of Search .................... 294/19 R, 22, 50.8, 294/50.9, 61, 100, 104

[56] References Cited

U.S. PATENT DOCUMENTS

| | | | |
|---|---|---|---|
| 874,512 | 12/1907 | Koch | 294/19 R X |
| 1,061,175 | 5/1913 | Guy et al. | 294/50.9 |
| 1,091,356 | 3/1914 | Larramore | 294/104 |
| 3,265,429 | 8/1966 | Shatt | 294/19 R |
| 3,276,806 | 10/1966 | Hansen | 294/19 R |
| 3,591,226 | 7/1971 | Elmore et al. | 294/19 R |
| 3,927,908 | 12/1975 | Knelson | 294/19 R |
| 3,937,512 | 2/1976 | Baughman | 294/19 R |

*Primary Examiner*—Johnny D. Cherry
*Attorney, Agent, or Firm*—Gust, Irish, Jeffers & Hoffman

[57] ABSTRACT

A stand-up trash retrieving and dumping device includes an elongated, tubular handle member and a flat spatula member attached to one end of the handle member and forming an obtuse angle with respect thereto. An elongated, flat, arm element has one end pivotally connected to the spatula member adjacent the one end of the handle member for pivotal movement between closed and open positions. The other end of the arm element is adapted to engage the spatula member in the closed position thereof and the arm element has an outwardly curved portion between its ends for grasping an enlarged object. The arm element has an enlarged hook portion integral with its outer end adapted to engage an abutment thereby to move the arm element to its open position. An elongated flexible element has one end connected to the hook portion and extends through part of the handle member. A finger hook member is attached to the other end of the flexible element and extends outwardly through a slot in the side wall of the handle member adjacent its other end. A relatively short, flexible element is attached to the finger hook element in the tubular member, extends out of the other end of the tubular member, and has a finger ring attached thereto whereby pulling either the finger hook portion or the finger ring causes the elongated flexible element to move the arm element to its open position.

8 Claims, 7 Drawing Figures

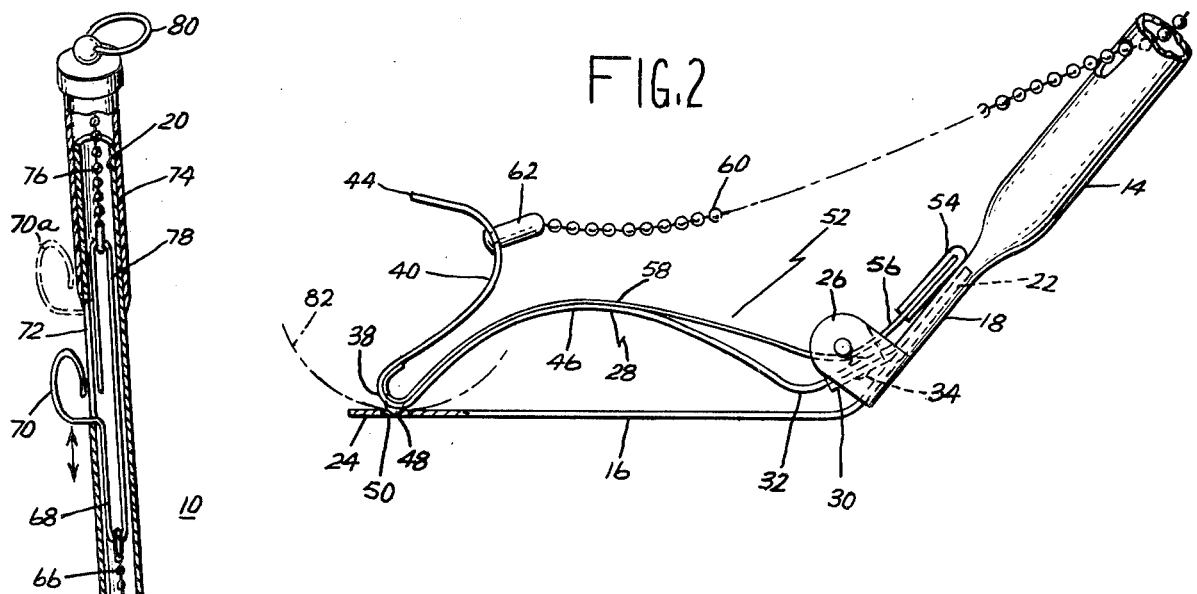
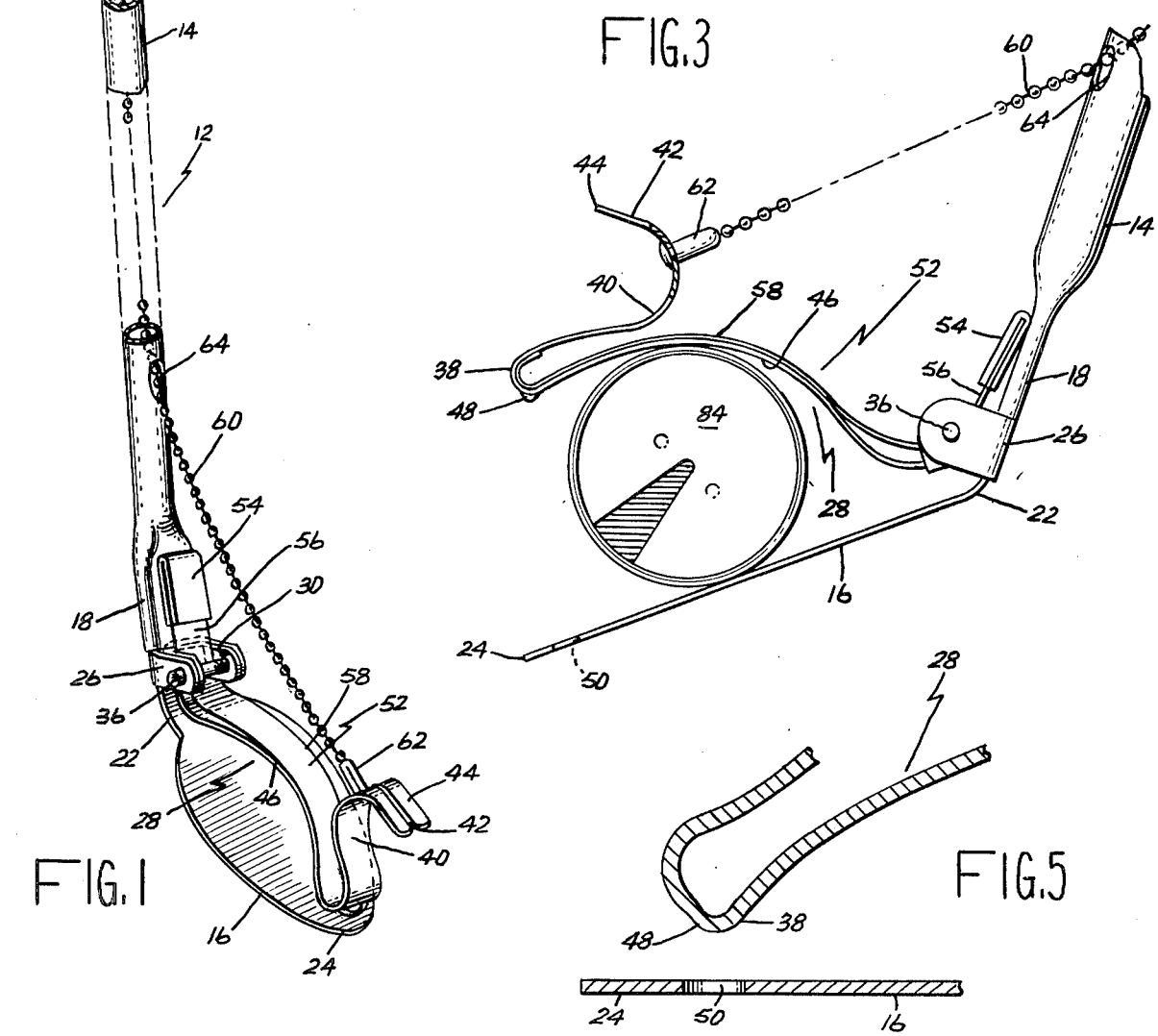

STAND-UP TRASH RETRIEVING AND DUMPING DEVICE

BACKGROUND OF THE INVENTION

1. Field of the Invention

This invention relates generally to stand-up devices for retrieving trash and other objects from the ground or other generally flat surfaces.

2. Description of the Prior Art

Loose paper trash has commonly been retrieved by the use of an elongated stick having a pointed element, such as a nail, attached to the end thereof; however, such devices are hazardous, paper or other objects impelled on the pointed element must be manually stripped therefrom, and there is no provision for picking up a larger object, such as an empty can or the like. Various types of stand-up trash retrieving devices have been proposed including a device having a pivoted arm intended for picking-up a can or the like but still retaining the pointed element with its attended hazard. Another type of trash retrieval device incorporated a plurality of stiff wire finger elements selectively opened and closed to grasp an object; however, such devices were not suitable for picking-up paper trash or other small objects.

It is therefore desirable to provide a stand-up device for retrieving trash and the like and thereafter dumping the same which does not employ a pointed element and which can be used for retrieving and thereafter dumping a wide variety of trash including larger objects such as cans.

SUMMARY OF THE INVENTION

The invention, in its broader aspects, provides a stand-up device for retrieving an object from a generally flat surface and thereafter dumping the same comprising an elongated member including a handle element having opposite ends and a generally flat spatula element extending from one end of the handle element and defining an obtuse angle therewith. An arm element is pivotally mounted on the elongated member and is movable between a first, closed position engaging the spatula element to grasp an object therebetween, and a second, open position spaced from the spatula element for dumping the object. Spring means is provided for normally biasing the arm element toward its closed position, and an elongated flexible element is provided guided by the handle element and having opposite ends with one end attached to the arm element and its other end having manually actuated pulling means thereon adjacent the other end of the handle element for moving the arm element to its open position. In a preferred embodiment, the arm element has an inner pivoted end and an outer end which engages the spatula element in the closed position, and an outwardly curved portion between its ends for grasping an enlarged object, such as a can.

It is accordingly an object of the invention to provide an improved stand-up device for retrieving an object from a generally flat surface and thereafter dumping the same.

Another object of the invention is to provide an improved stand-up device for retrieving objects of different sizes and configurations from a generally flat surface and thereafter dumping the same.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a view in perspective, partly broken away, showing the improved stand-up trash retrieval and dumping device of the invention;

FIG. 2 is a fragmentary, side view, partly in cross-section, showing the spatula and pivoted arm elements of the device of FIG. 1 in the closed position;

FIG. 3 is a view similar to FIG. 2 but showing the spatula element and pivoted arm element grasping a can;

FIG. 5 is a fragmentary side, cross-sectional view further showing the outer end of the pivoted arm element of the device of the previous figures;

DESCRIPTION OF THE PREFERRED EMBODIMENT

Figure 4:
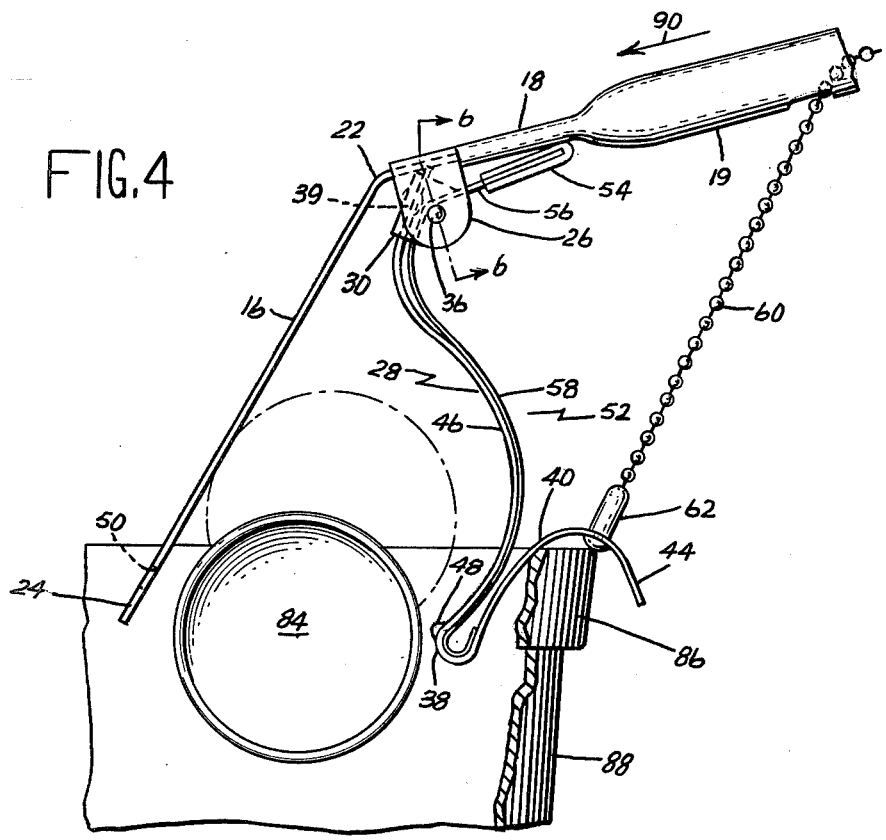
FIG. 4 is a side view, partly in cross-section, showing a feature of the invention which facilitates dumping an object.

Referring now to the figures of the drawings, the improved stand-up device for retrieving trash or other objects from a flat surface and thereafter dumping the same into a receptacle, or the like, generally indicated at 10, comprises elongated member 12 including tubular handle element 14 and flat spatula element 16. Handle element 14 has lower and upper ends 18, 20 and spatula element 16 has inner and outer ends 22, 24. Spatula element 16 defines an obtuse angle with handle element 14, as best seen in FIGS. 2, 3 and 4, and has its inner end 22 inserted in lower end 18 of tubular member 14 which is flattened or crimped thereover thereby to secure spatula element 16 to handle element 14.

A generally U-shaped pivot member 26 is secured to inner end 22 of spatula element 16 abutting lower end 18 of handle element 14, as by welding. Elongated arm element 28 formed of suitable, flat strip stock has generally U-shaped pivot member 30 attached to its end 32, as by rivet 34. Pivot member 30 is pivotally connected to pivot member 26 by a suitable pin 36, such as a roll pin. Arm element 28 may thus be moved pivotally from a closed position with its outer end 38 engaging spatula element 16 adjacent its outer end, as shown in FIGS. 1 and 2, and an open position, as shown in FIGS. 3 and 4.

Arm element 28 has hook portion 40 integrally extending from outer end 38. Slot 42 is formed in end 44 of hook portion 40. Arm element 28 has curved portion 46 intermediate its ends 32, 38 for a purpose to be hereinafter described. Projection 48 is formed from end 38 of arm element 28, as best seen in FIG. 5, and is received in the closed position by opening 50 adjacent end 24 of spatula element 16, as shown in FIG. 2.

Figure 6:
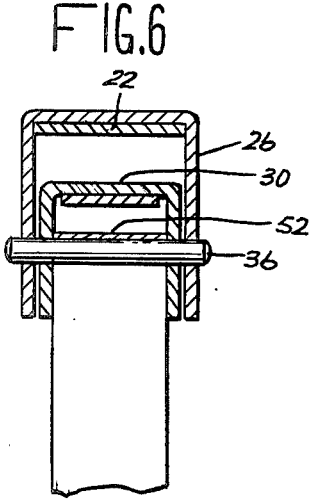
FIG. 6 is a fragmentary, cross-sectional view taken generally along the line 6—6 of FIG. 4.
Figure 7:
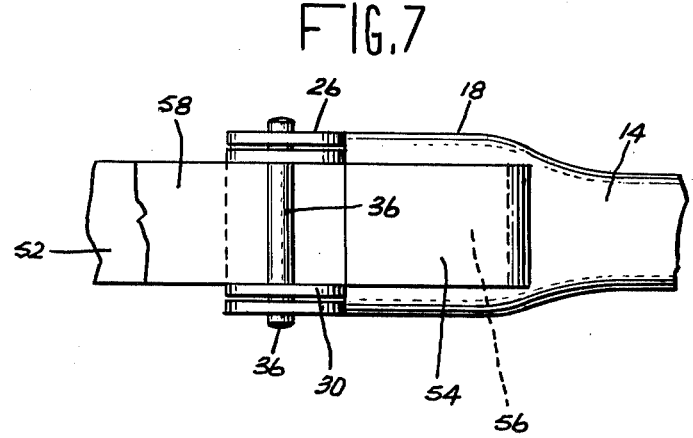
FIG. 7 is a fragmentary top view further showing the pivotal connection of the arm element to the handle element.

Elongated leaf spring 52 passes under and is retained by pivot pin 36 (FIG. 6) and has pad 54 on its end 56 engaging end 18 of handle element 14. End 58 of leaf spring 52 engages curved portion 46 of arm element 28 thereby biasing the same toward the closed position thereof, as shown in FIG. 2. It will be seen that the provision of pad 54 prevents end 56 of leaf spring 52 from digging into end 18 of handle element 14.

Elongated, flexible, bead chain element 60 has end 62 seated in slot 42 in end 44 of hook portion 40. Bead chain 60 extends into the interior of handle element 14 through opening 64 in the side wall thereof and has its other end 66 attached to intermediate bight portion 68 of finger hook member 70 which extends outwardly through slot 72 in handle element 14 adjacent end 20 (FIG. 1). Cap member 74 closes open end 20 of handle element 14 and has an opening (not shown) in the end thereof. Relatively short, flexible, bead chain element 76 is attached to end bight portion 78 of finger hook member 70, extends outwardly through the opening (not shown) in cap member 74, and has finger ring 80 attached thereto. It will now be seen that manually pulling finger hook portion 70 upwardly to the position shown in dashed lines at 70a in FIG. 1, or manually pulling finger ring 80 upwardly will result in pivoting arm element 28 to its open position against the force exerted by leaf spring 52. This permits spatula element 16 to be slid under a piece of flat paper trash or the like so that release of finger hook member 70 or finger ring 80 permits arm element 28 to return to its closed position whereby projection 48 engages the object of trash, as suggested in dashed lines at 82 in FIG. 2. Further, as shown in FIG. 3, arm element 28 in its open position will grasp a larger object, such as empty can 84.

Referring briefly to FIG. 4, hook portion 40 of arm element 28 may be engaged with abutment 86, such as the rim of receptacle 88, thereby moving arm element 28 to its open position upon downward movement of handle element 14, as shown by arrow 90 in FIG. 4 thereby to deposit object 84 into receptacle 88.

While there have been described above the principles of this invention in connection with specific apparatus, it is to be clearly understood that this description is made only by way of example and not as a limitation to the scope of the invention.

What is claimed is:

1. A stand-up device for retrieving an object from a generally flat surface and thereafter dumping the same comprising: an elongated member including a handle element having opposite ends and a generally flat spatula element extending from one end of said handle element and defining an obtuse angle therewith; an arm element having an inner end pivotally mounted on said spatula element adjacent said one end of said handle element, said arm element comprising an elongated member formed of flat strip material, said arm element being movable between a first closed position cooperating with said spatula element selectively to grasp an object therebetween, and a second open position spaced from said spatula element for dumping said object, said arm element having an outer end engaging said spatula element in said closed position and having an outwardly curved portion between said ends thereof thereby to grasp an enlarged object, said arm element having a hook portion integral therewith extending outwardly from said outer end adapted to be engaged with an abutment thereby to move said arm element to said open position thereof; a leaf spring having opposite ends with one end engaging said handle element adjacent said one end thereof and the other end engaging said arm element for normally biasing said arm element toward said closed position thereof; and an elongated flexible element guided by said handle element and having opposite ends with one end attached to said hook portion of said arm element and its other end having manually actuated pulling means thereon adjacent the other end of said handle element for moving said arm element to said open position.

2. The device of claim 1 wherein said arm element has a projection formed thereon adjacent said outer end for engaging a relatively small object in said closed position, said spatula element having an opening formed therein for receiving said projection in said closed position of said arm element.

3. The device of claim 1 wherein said handle element is tubular and has an opening in the side wall thereof adjacent said one end, said flexible element having said other end thereof extending in said tubular element and said one end thereof extending outwardly through said opening to said arm element.

4. The device of claim 3 wherein said handle element has another opening in the side wall thereof adjacent said other end, said pulling means comprising a finger hook element extending out of said other opening.

5. The device of claim 3 wherein said handle element has another opening therein at said other end, said pulling means including a portion extending through said other opening and having a finger ring attached thereto.

6. The device of claim 3 wherein said handle element has an axially extending slot formed therein adjacent said other end, said other end of said handle element being open, and further comprising a closure member on said other end of said handle element and having an opening therein communicating with the interior thereof, said pulling means comprising a pulling member in said handle element attached to said other end of said flexible element and having a finger hook portion extending out of said slot, another flexible element having one end attached to said pulling member and its other end extending outwardly through said opening in said closure member, and a finger ring attached to said other end of said other flexible element.

7. The device of claim 6 wherein said inner end of said arm element is pivotally connected to said spatula element by a pivot pin, said leaf spring being restrained intermediate its ends by said pivot pin.

8. The device of claim 7 wherein said arm element has a projection formed therefrom adjacent said outer end for engaging a relatively small object in said closed position, said spatula member having an opening formed therein for receiving said projection in said closed position of said arm element, said one end of said leaf spring having a pad thereon, said hook portion having a slotted distal end, said elongated flexible element comprising a beaded chain with said one end engaging said slotted end of said hook portion, said pulling member being an elongated member having opposite ends with said finger hook portion formed at one end thereof and the other end having said other flexible element attached thereto, said other end of said elongated flexible element being attached to said pulling member intermediate said ends.

* * * * *